United States Patent [19]
Lassiter

[11] 4,107,676
[45] Aug. 15, 1978

[54] TRANS-HORIZON NAVIGATION SYSTEM

[76] Inventor: James W. Lassiter, P.O. Box 158, Ocala, Fla. 32617

[21] Appl. No.: 847,766

[22] Filed: Nov. 2, 1977

[51] Int. Cl.² ............................. G01S 9/56; G01S 9/04
[52] U.S. Cl. ............................... 343/6.5 R; 343/13 R; 343/100 CL
[58] Field of Search ............ 343/6.5 R, 13 R, 100 CL

[56] References Cited
U.S. PATENT DOCUMENTS

| 3,553,691 | 1/1971 | Lassiter | 343/15 |
|---|---|---|---|
| 3,875,517 | 4/1975 | Dilley | 343/100 CL X |
| 3,875,571 | 4/1975 | Davis, Jr. et al. | 343/6.5 R |
| 3,969,725 | 7/1976 | Couvillon et al. | 343/6.5 R |

Primary Examiner—Nelson Moskowitz
Assistant Examiner—Richard E. Berger
Attorney, Agent, or Firm—Dunlap, Codding & McCarthy

[57] ABSTRACT

A trans-horizon navigation system wherein a predetermined sequence of control pulses is phase-encoded onto an RF carrier for transmission from a first transceiver to a second transceiver, the second transceiver including a correlator which provides an output pulse in response to detecting the sequence of control pulses in a received transmission. An improved AGC circuit configuration is also disclosed.

10 Claims, 6 Drawing Figures

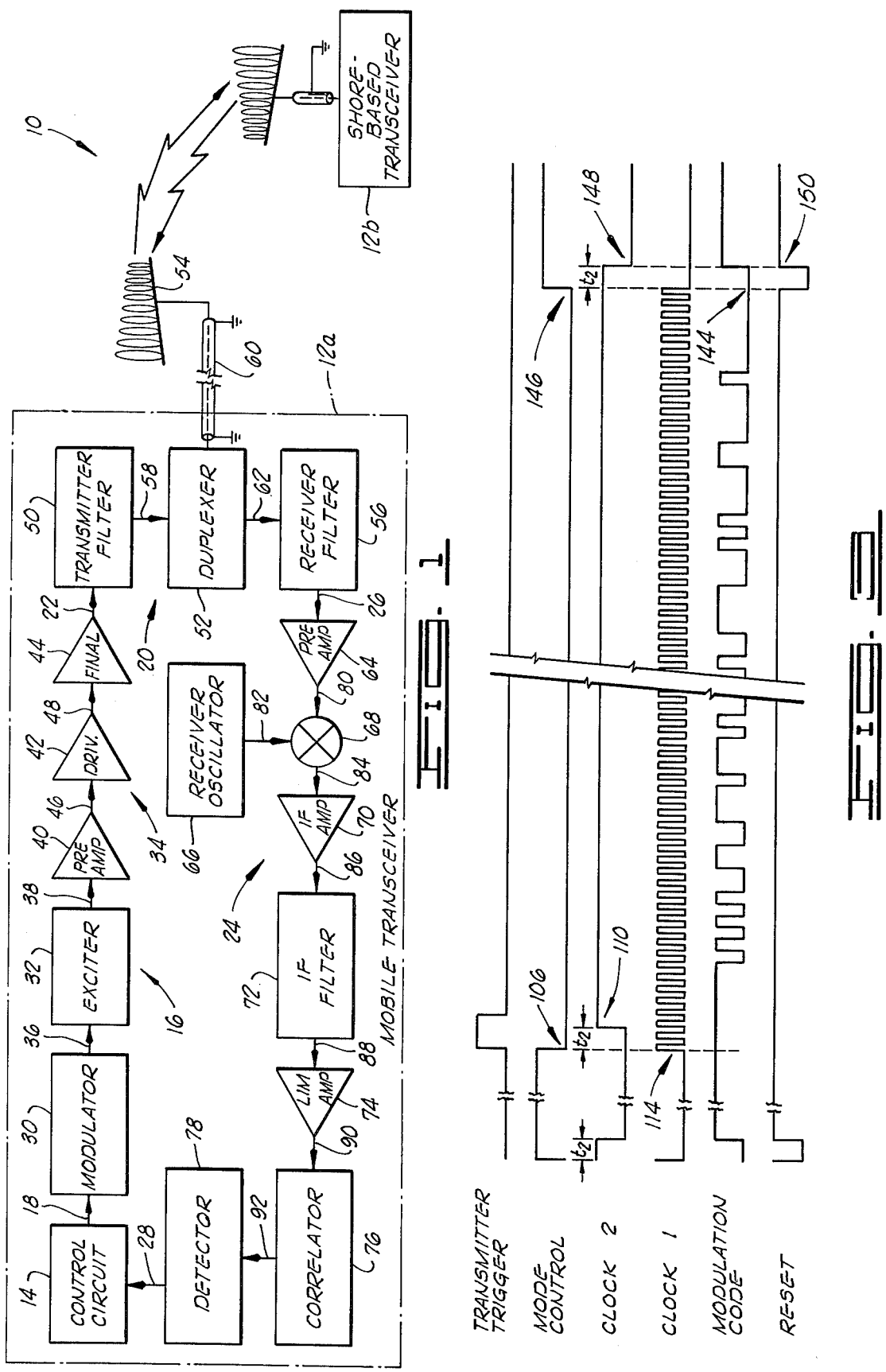

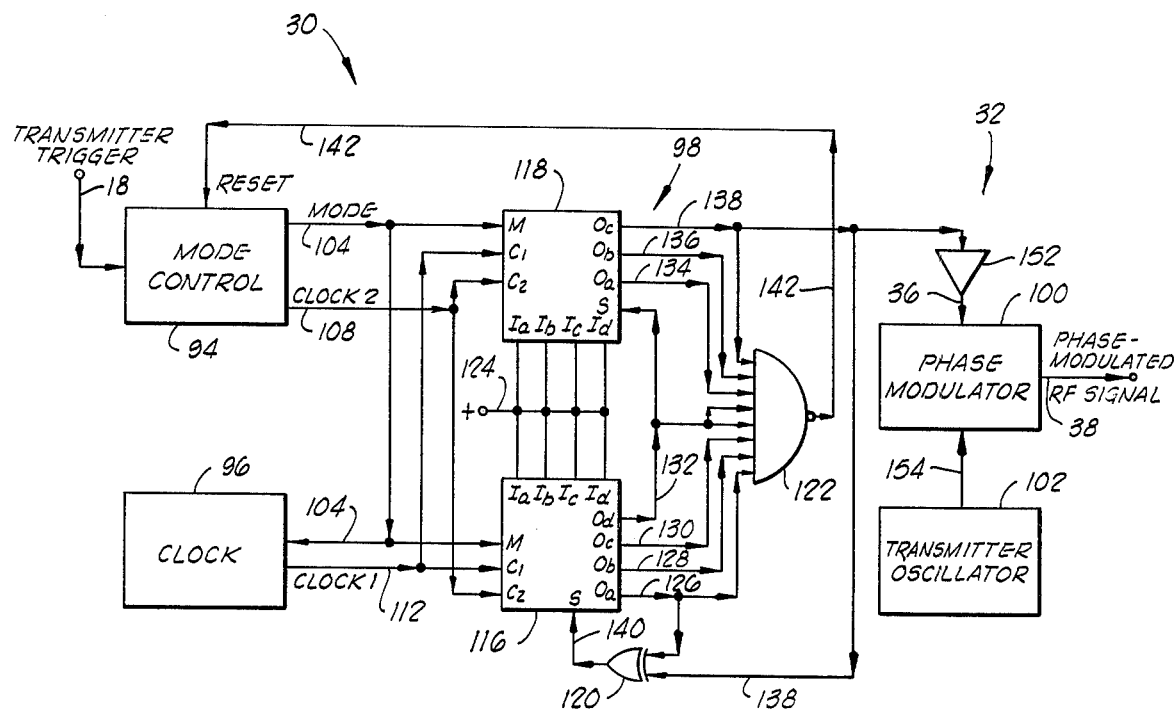
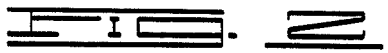
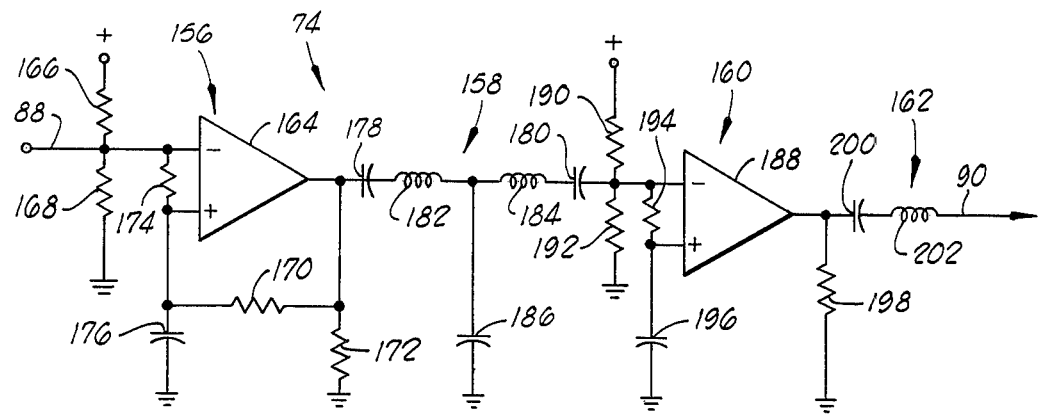
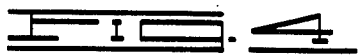

TRANS-HORIZON NAVIGATION SYSTEM

BACKGROUND OF THE INVENTION

1. Field of the Invention

This invention relates generally to improvements in trans-horizon navigation systems, and, more particularly, but not by way of limitation, to a trans-horizon navigation system wherein a predetermined sequence of control pulses is phase-encoded onto an RF carrier for transmission to a receiver having a correlator responsive to the sequence of control pulses.

2. Description of the Prior Art

The basic teachings for long range position determination systems of the type disclosed herein are contained in U.S. Pat. No. 3,553,691, issued to J. W. Lassiter, the inventor of the present invention. In this Patent, it was emphasized that precise tuning of transmitting and receiving components is necessary in trans-horizon navigation systems in order to compensate for the high levels of path loss inherent in over the horizon signal transmission. It was also noted in this Patent that the greater path loss experienced at higher transmission frequencies requires higher system gain in order to provide an acceptable signal to noise ratio.

In U.S. Pat. No. 3,875,571, issued to Davis, Jr. et al., a long range marine navigation system of the pulsed transmission type is disclosed. In this Patent, the transmitter RF carrier is frequency modulated via a non-linear frequency modulation signal resulting from the stretching of a short, high frequency pulse by a surface wave device of the chirped type. At the receiver end, the frequency modulation signal is extracted in a conventional manner and compressed into a short, high frequency pulse approximating the original pulse by a surface wave device of the chirped type which is matched in characteristics to the surface wave device contained in the transmitter.

In U.S. Pat. No. 3,889,258, issued to Holmes et al., the pulse transmission system of U.S. Pat. No. 3,875,571 is employed in a navigation ranging system wherein individual base stations are responsive to unique pulse position codes which are frequency modulated onto a selected RF carrier via surface wave devices of the chirped type in a mobile station. In this Patent, the interaction between the mobile station and the several base stations is accomplished via a complex series of control and ranging pulse sequences.

In general, the techniques taught in U.S. Pat. No. 3,553,691 provide a basic foundation for all modern trans-horizon navigation systems. Further, the refinements in matched filter pulse transmission techniques taught in U.S. Pat. No. 3,875,571 have enabled improvements in noise rejection at comparable system power and loop gain levels. In addition, the pulse position discrimination technique taught in U.S. Pat. No. 3,889,258 enabled complete trans-horizon navigation systems to operate on single transmission channels rather than being spread over several channels. However, all such systems have been found to be generally unsatisfactory in operation for various mechanical and theoretical reasons, particularly when the distances between the mobile station and the base stations is in excess of 350 miles. Further, systems constructed in accordance with these patents have been determined to be incapable of satisfactory operation within the internationally recognized navigation band from 2900 to 3100 MHz.

SUMMARY OF THE INVENTION

The present invention contemplates an improved trans-horizon navigation system wherein a modulation code comprised of a predetermined sequence of control pulses is phase-encoded or phase modulated onto an RF carrier for transmission from a mobile transceiver to a shore-based transceiver, wherein the shore-based transceiver includes a correlator which provides a correlation signal the amplitude of which is proportional to the correlation between a received transmission and the sequence of control pulses comprising the modulation code. Upon detecting a correlation signal exceeding a predetermined threshhold value, the shore-based transceiver will respond by phase-modulating a modulation code of like or different format onto an RF carrier for transmission to the mobile transceiver. Upon correcting for the known response time period required by the shore-transceiver to detect a received transmission and to provide a response transmission, the travel time of the RF signal between the mobile and shore-based transceivers may be derived to determine the distance between the mobile and shore-based transceivers. In a preferred form, individual shore-based transceivers within a plurality of shore-based transceivers will respond with a phase-modulated response signal in response to receiving a unique pulse position coded, phase-modulated request signal from the mobile transceiver.

The improved trans-horizon navigation system also includes an improved AGC circuit configuration wherein a limiting amplifier is employed to limit the strength of a received transmission to the dynamic range of an associated AGC circuit.

An object of the present invention is to provide a trans-horizon navigation system wherein a predetermined sequence of control pulses is phase-modulated onto an RF carrier for transmission between mobile and shore-based transceivers.

Another object of the present invention is to provide a trans-horizon navigation system wherein a received, phase-modulated RF signal is correlated with a predetermined modulation code to determine the correlation between the received transmission and the modulation code.

Still another object of the present invention is to provide a trans-horizon navigation system wherein a surface acoustic wave delay line responsive to a predetermined sequence of control pulses is employed to detect a received transmission phase-modulated via the predetermined sequence of control pulses.

Yet another object of the present invention is to provide a trans-horizon navigation system capable of effective performance at S-band frequencies from about 2900 to 3100 MHz.

Still another object of the present invention is to provide a trans-horizon navigation system wherein the pulse matching ability of surface acoustic wave delay lines of the tapped type are employed to detect a received transmission having a corresponding pulse sequence phase-modulated thereon.

Another object of the present invention is to provide an improved AGC circuit configuration in a trans-horizon navigation system wherein a limiting amplifier is employed to maintain the signal strength of a received transmission within the dynamic range of an AGC circuit.

Other objects and advantages of the present invention will be evident from the following detailed description when read in conjunction with the accompanying drawings which illustrate the various embodiments of the invention.

BRIEF DESCRIPTION OF THE DRAWINGS

FIG. 1 is a block schematic of a trans-horizon navigation system constructed in accordance with the preferred embodiment of the present invention.

FIG. 2 is a schematic representation of the modulator and exciter portions of the trans-horizon navigation system shown in FIG. 1.

FIG. 3 is a timing diagram illustrating the operation of the modulator and exciter shown in FIG. 2.

FIG. 4 is a schematic diagram of the limiting amplifier of the trans-horizon navigation system shown in FIG. 1.

DESCRIPTION OF THE PREFERRED EMBODIMENT

Figure 5:
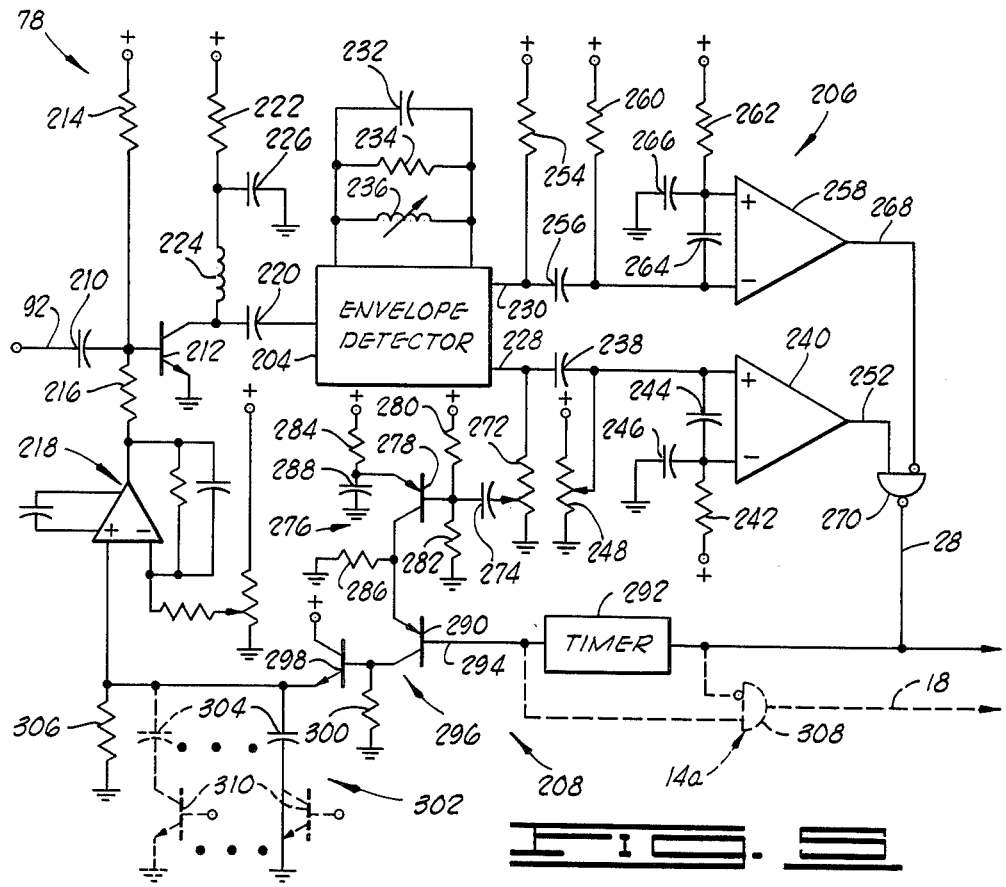
FIG. 5 is a schematic diagram of the detector of the trans-horizon navigation system shown in FIG. 1.

Referring to the drawings in general, and to FIG. 1 in particular, shown therein and referred to by the general reference number 10 is a trans-horizon navigation system constructed in accordance with the preferred embodiment of the present invention. In a preferred form, the navigation system is comprised of a mobile transceiver 12a positioned on a mobile unit such as a ship, and one or more shore-based transceivers 12b disposed at selected fixed locations at spaced intervals along or adjacent to a shoreline proximate to the ship. In a manner analogous to the short range navigation systems generally referred to via the tradename Shoran, the transceivers 12b positioned at fixed locations cooperate with the transceiver 12a on the mobile unit to provide a measurement of the time required by radio frequency waves to travel between the mobile and fixed transceivers 12. Since the velocity of RF wave propagation is known and the distance between the shore-based transceivers 12b may be determined in a conventional manner, a simple time-to-space transformation may be employed to derive an indication or measurement of the distance between the mobile transceiver 12a and each of the shore-based transceiver 12b.

For purposes of explanation, only the transceiver 12a shown in FIG. 1 will be described in detail, with any differences in the manner of operation or construction of a shore-based transceiver 12b being noted when appropriate. Thus, in the mobile transceiver 12a, a control circuit 14, in response to the actuation thereof by a human operator, will provide a pair of transmitter trigger signals a predetermined time period ($t_1$) apart, for application to a transmitter portion 16 of the transceiver 12a via a signal path 18. The transmitter portion 16 is responsive to the applied transmitter trigger signals and provides a phase-modulated request signal having predetermined characteristics for application to an antenna portion 20 of the transceiver 12a via a signal path 22 in response to each of the transmitter trigger signals. The antenna portion 20 will respond to the applied phase-modulated request signals by transmitting the received phase-modulated request signals.

For reasons and in a manner to be made more clear hereinafter, a predetermined one of the shore-based transceivers 12b will respond to receiving the transmitted phase-modulated request signals by transmitting a phase-modulated response signal having predetermined characteristics a predetermined response time period after receiving the second transmitted phase-modulated request signal. In response to receiving the transmitted phase-modulated response signal, the antenna portion 20 of the mobile transceiver 12a will apply the received, transmitted phase-modulated response signal to a receiver portion 24 of the transceiver 12a via a signal path 26. The receiver portion 24 is responsive to the phase-modulated response signal applied thereto and will provide a detection signal for application to the control circuit 14 via a signal path 28 in response to detecting the predetermined characteristics of the phase-modulated response signal.

In response to the detection signal applied thereto, the control circuit 14 will terminate a timing sequence initiated at the time the first transmitter trigger signal was produced. After compensating for the known response time period associated with the detection and transmission of the phase-modulated response signal by the shore-based transceiver 12b, the control circuit 14 may then calculate in a well known manner the travel time of the RF signals between the mobile transceiver 12a and the shore-based transceiver 12b. Applying another well known transformation, the control circuit 14 may then calculate the distance between the mobile transceiver 12a and the shore-based transceiver 12b. Thereafter, the distance between the mobile unit and the remaining shore stations may be similarly determined.

With reference to the shore-based transceivers 12b, the transmitter, antenna and receiver portions thereof operate in substantially the same manner as the corresponding portions of the mobile transceiver 12. However, the control circuit of the shore-based transceivers 12b, instead of being responsive to a human operator, will respond substantially automatically to receiving two detection signals spaced the predetermined time period ($t_1$) apart by providing a transmitter trigger signal for application to the transmitter portion thereof. Thus, each of the shore-based transceivers 12b may be induced to provide the phase-modulated response signal by transmitting from the mobile transceiver 12a two phase-modulated request signals spaced apart the predetermined time period ($t_1$) uniquely assigned to the respective shore-based transceiver 12b.

In a preferred form, the transmitter portion 14 of each of the transceivers 12a and 12b is comprised of a modulator 30, an exciter 32 and an amplifier section 34. The modulator 30 is connected to the control circuit 14 via the signal path 18 and provides a modulation code comprised of a predetermined sequence of control pulses via a signal path 36 in response to receiving each transmitter trigger signal provided by the control circuit 14 via the signal path 18. In the preferred embodiment, each of the control pulses comprising the modulation code is in a predetermined one of mutually exclusive high and low states. For the purposes of this description, the various references to the signals being in the high or low states are intended to be construed in accordance with the conventional digital definitions thereof.

The exciter 32 is connected to the modulator 30 via the signal path 36 and provides, via a signal path 38, the phase-modulated request signal having a first predetermined phase in response to receiving a control pulse in the high state from the modulator 30 via the signal path 36 and a second predetermined phase in response to receiving a control pulse in the low state. For the purposes of explanation, it will be assumed hereinafter that the frequency of the phase-modulated request signal provided by the exciter 32 is on the order of about 420 to 450 MHz, although it has been determined that satisfactory operation at frequencies as high as 2900 to 3100 MHz may be achieved if the system loop gain techniques disclosed in U.S. Pat. No. 3,553,691, issued to J. W. Lassiter, are appropriately employed.

The amplifier section 34 is comprised of a preamplifier 40, a driver amplifier 42, and a final amplifier 44. The preamplifier 40 is connected to the exciter 32 via the signal path 38 and amplifies the phase-modulated request signal received from the exciter 32 via the signal path 38 from approximately 10 milliwatts to approximately 20 watts for output via a signal path 46. The driver amplifier 42 is connected to the preamplifier 40 via the signal path 46 and amplifies the phase-modulated request signal received from the preamplifier 40 via the signal path 46 to approximately 100 watts for output via a signal path 48. The final amplifier 44 is connected to the driver amplifier 42 via the signal path 48 and amplifies the phase-modulated request signal received from the driver amplifier 42 via the signal path 48 to approximately 300 watts for application to the antenna assembly 20 via the signal path 22. Of course, if higher power levels are desired, further stages of amplification may be provided in a conventional manner to compensate for any anticipated power losses in the antenna assembly 20 and the projected transmission path loss attenuation.

The antenna assembly 20 is comprised of a transmitter filter 50, a duplexer 52, a tuned antenna 54, and a receiver filter 56. The transmitter filter 50 is connected to the final amplifier 44 of the amplifier section 34 via the signal path 22, and is constructed in a conventional manner to pass the phase-modulated request signal and a predetermined band of frequencies associated therewith for output via a signal path 58. The duplexer 52 is connected to the transmitter filter 50 via the signal path 58 and applies the phase-modulated request signal received therefrom to the tuned antenna 54 via a shielded coaxial cable 60. The tuned antenna 54 is connected to the duplexer 52 via the shielded coaxial cable 60 and is constructed in a conventional manner to transmit and receive in an optimum manner a selected band of frequencies associated with, and including, the frequency of the phase-modulated request signal.

Since the receiver portion 24 of the transceiver 12a operates substantially independently of the transmitter portion 16 thereof, it will be convenient for purposes of explanation to assume for the moment that a specific, shore-based transceiver 12b has received the transmitted phase-modulated request signal and has transmitted the phase-modulated response signal in response thereto. Thus, the transmitted phase-modulated response signal will be received by the tuned antenna 54 and applied thereby to the duplexer 52 via the shielded coaxial cable 60, the duplexer 52 providing the received, transmitted phase-modulated response signal via a signal path 62. The receiver filter 56 is connected to the duplexer 52 via the signal path 62 and is constructed in a conventional manner to pass the phase-modulated response signal applied thereto by the duplexer 52, together with a predetermined band of frequencies associated with the frequency of the phase-modulated response signal, for output via the signal path 26.

In a preferred form, the receiver portion 24 of each of the transceivers 12a and 12b is comprised of a preamplifier 64, a receiver oscillator 66, a mixer 68, an IF amplifier 70, an IF filter 72, a limiting amplifier 74, a correlator 76, and a detector 78. The preamplifier 64 is connected to the receiver filter 56 via the signal path 26 and amplifies the filtered phase-modulated response signal for output via a signal path 80. The receiver oscillator 66 is constructed in a conventional manner to provide an RF signal via a signal path 82 having a predetermined frequency relative to the frequency of the phase-modulated response signal. The mixer 68 is connected to the preamplifier 64 via the signal path 80 and to the receiver oscillator 66 via the signal path 82, and provides an IF signal via a signal path 84 having a frequency proportional to the difference in frequency between the frequency of the phase-modulated response signal provided by the preamplifier 64 and the frequency of the RF signal provided by the receiver oscillator 66.

The IF amplifier 70 is connected to the mixer 68 via the signal path 84, and amplifies the IF signal for output via a signal path 86. The IF filter 72 is connected to the IF amplifier 70 via the signal path 86, and is constructed in a conventional manner to pass the IF signal applied thereto by the IF amplifier 70 via the signal path 86, together with a band of frequencies associated with the IF signal, for output via a signal path 88. The limiting amplifier 74 is connected to the IF filter 72 via the signal path 88, and amplifies the received IF signal while clipping on the amplitude of the noise entrained therein, with the noise limited IF signal being output via a signal path 90.

The correlator 76 is connected to the limiting amplifier 74 via the signal path 90, and provides a correlation signal via a signal path 92 the amplitude of which is proportional to the correlation between the IF signal applied thereto by the limiting amplifier 74 and the predetermined sequence of control pulses produced by the modulator in the shore-based transceiver 12b. In a preferred form, the correlator 76 is comprised of a surface acoustic wave device of the tapped type. Such surface acoustic wave delay lines are constructed in a well known manner to provide an output pulse of significant amplitude in response to receiving a pulsed signal substantially corresponding to the pattern of taps plated on the surface of a crystal portion thereof.

The detector 78 is connected to the correlator 76 via the signal path 92, and provides a detection signal for application to the control circuit 14 via the signal path 28 in response to receiving a correlation signal exceeding a predetermined threshhold value. In a preferred form the detector 78 provides the detection signal at the peak of each correlation signal which exceeds the predetermined threshhold value.

In the preferred embodiment, the modulation code provided by the modulator 30 of the mobile transceiver 12a is the same as the modulation code provided by the modulator in each of the shore-based transceivers 12b, so that the phase-modulated request signal has the same phase format as the phase-modulated response signal. However, if desired, the modulators of the shore-based transceivers 12b may be constructed to provide a different modulation code than the modulator 30 in the mobile transceiver 12a, so long as the correlator 76 in the mobile transceiver 12a is appropriately modified to respond to the different, response-format modulation code.

Detailed Description of the Modulator 30 and the Exciter 32

As can be seen in FIG. 2, the modulator 30 is comprised of a mode control circuit 94, a clock 96, and a code generator 98. It can also be seen that the exciter 32 is comprised of a phase modulator 100 and a transmitter oscillator 102. As appropriate, references will be made hereinafter to the various timing diagrams shown in FIG. 3 which illustrate typical wave forms at selected locations in the modulator 30 during the operation thereof.

The mode control circuit 94 is connected to the control circuit 14 via the signal path 18, and will respond to receiving the transmitter trigger signal in the high state via the signal path 18 by providing a mode control signal in the low state via the signal path 104, as generally indicated at 106 in FIG. 3. A predetermined time period ($t_2$) after receiving the transmitter signal in the high state, the mode control circuit 94 will also provide a clock-2 signal in the high state via a signal path 108, as generally indicated at 110 in FIG. 3.

The clock 96 is connected to the mode control circuit 94 via the signal path 104, and will respond to receiving the mode control signal in the low state by providing a pulsed clock-1 signal at a predetermined rate on the order of about 5 KHz to 10 KHz via a signal path 112. In a preferred form, the clock 96 includes a free-running crystalcontrolled oscillator and one or more conventional divider circuits having the output thereof gated under the control of the mode control signal. In this form, the clock-1 signal will be comprised of a train of pulses, as shown at 114 in FIG. 3, in the interval during which the mode control signal is in the low state.

The code generator 98 is comprised primarily of a pair of 4-bit parallel-in parallel-out shift registers 116 and 118, an EXCLUSIVE-OR gate 120, and an 8-input NAND gate 122. Each of the shift registers 116 and 118 have the mode input terminal (M) thereof connected to the mode control circuit 94 via the signal path 104; the clock-1 input terminals ($C_1$) thereof connected to the clock 96 via the signal path 112; the clock-2 input terminals ($C_2$) thereof connected to the mode control circuit 94 via the signal path 108; and each of the parallel input terminals ($I_a$, $I_b$, $I_c$, and $I_d$) thereof connected to a source of positive voltage via a signal path 124.

Each of the bits stored in the shift register 116 are made available for application to respective input terminals of the NAND gate 122 via the parallel output terminals ($O_a$, $O_b$, $O_c$, and $O_d$) on respective signal paths 126, 128, 130 and 132. In a similar manner, the three low order bits stored in the shift register 118 are made available for application to respective input terminals of the NAND gate 122 via the parallel output terminals ($O_a$, $O_b$, and $O_c$) on respective signal paths 134, 136, and 138. To avoid having one of the eight input terminals of the NAND gate 122 having no signal applied thereto, the high order bit of the shift register 116 is applied to two of the input terminals of the NAND gate 122 via the signal path 132.

In response to receiving the mode control signal in the low state via the signal path 104, each of the shift registers 116 and 118 will respond to each of the pulses comprising the clock-1 signal applied thereto via the signal path 112 by shifting the bit sequences stored therein to the right. For each such shift, the low order bit in the shift register 116 is provided via a sequential input terminal (S) from the EXCLUSIVE-OR gate 120 via a signal path 140, with the high order bit of the shift register 116 being shifted into the low order bit position of the shift register 118 via a sequential input terminal (S) thereof via the signal path 132. In a preferred form, the EXCLUSIVE-OR gate 120 has one input terminal thereof connected to the low order bit position of the shift register 116 via the signal path 126 and the other input terminal thereof connected to the high order bit position of the shift register 118 via the signal path 138, while the output terminal of the NAND gate 122 is connected to a reset terminal of the mode control circuit 94 via a signal path 142.

Assuming that each of the bit positions of each of the shift registers 116 and 118 have been initially placed in the high state and that the mode control signal is in the low state, each of the shift registers 116 and 118 will respond to the pulses comprising the clock-1 signal by shifting the logic states or bits provided by the EXCLUSIVE-OR gate 120 for subsequent, sequential output via the signal path 138. Simultaneously, each of the bits stored in the shift registers 116 and 118 will be applied in parallel to the NAND gate 122. As soon as all of the bit positions in the shift registers 116 and 118 are simultaneously in the low state, as at 144 in FIG. 3, the NAND gate 122 will provide a reset signal in the low state for application to the mode control circuit 94 via the signal path 142.

In response to receiving the reset signal in the low state via the signal path 142, the mode control circuit 94 will produce the mode control signal in the high state via the signal path 104, as shown at 146 in FIG. 3. After the predetermined time period ($t_2$), the mode control circuit 94 will provide the clock-2 signal in the low state via the signal path 108, as shown at 148 in FIG. 3. However, with the mode control signal in the high state, each of the shift registers 116 and 118 will respond to the negative transition of the clock-2 signal by setting each of the bit positions thereof in the high state due to the positive voltage applied to the parallel input terminals ($I_a$–$I_d$) via the signal path 124. In response to the resultant change of state of the various signals applied thereto, the NAND gate 122 will change the state of the reset signal from the low state to the high state, as at 150 in FIG. 3, thereby enabling the operation of the mode control circuit 94 in response to a subsequent transmitter trigger signal.

The modulation code provided by the code generator 98 via the signal path 138 is buffered via a buffer amplifier 152 for application to the phase modulator 100 of the exciter 32 via the signal path 36. The transmitter oscillator 102, which is preferably a free-running, crystal-controlled oscillator, provides a transmitter carrier signal via a signal path 154 having a predetermined frequency, preferably from about 200 MHz to about 3300 MHz. The phase modulator 100 is connected to the code generator 98 of the modulator 30 via the signal path 36 and to the transmitter oscillator 102 via the signal path 154, and operates to phase-encode the received modulation code onto the received transmitter carrier signal for output via the signal path 38. In a preferred form, the phase modulator 100 either passes or inverts the phase of the received transmitter carrier signal depending on the logic state of the received modulation code.

As will be clear to those skilled in the art, the feedback provided by the signal paths 126 and 138 through the EXCLUSIVE-OR gate 120 will result in the production via the signal path 138 of the sequence of control pulses referred to in FIG. 3 as the modulation code. In general, the modulation code produced by the code generator 98 will be determined by the pattern recognition characteristics of the particular apparatus selected for use as the correlator 76. For example, the preferred embodiment shown in FIG. 2 has been designed to produce the modulation code illustrated in FIG. 3 to correlate with the tap pattern on a surface acoustic wave delay line manufactured by Rockwell International as Model No. LTDL 120-111. This particular surface acoustic wave delay line is manufactured with 123 taps and provides approximately 21 dB gain on a 5.7 MHz band width centered at 123 MHz.

Integrated circuit four-bit parallel-in parallel-out shift registers suitable for use as shift registers 116 and 118 are manufactured by Texax Instruments as Model No. SN74LS95. A balanced mixer suitable for use as the phase modulator 100 is manufactured by Anzac Electronics of Waltham, Massachusetts, as Model No. MD-108. All of the remaining components shown in FIG. 2 are of conventional, well known construction.

Description of Limiting Amplifier 74

With reference to FIG. 4, the limiting amplifier 74 preferably includes a first amplifier section 156, an intermediate filter section 158, a second amplifier section 160, and an output filter section 162. The first amplifier section 156 includes a high gain operational amplifier 164 having the negative input terminal thereof connected to the IF filter 72 via the signal path 88 and the positive input terminal thereof connected to the output terminal thereof via a divider network comprised of resistors 166 and 168. In addition, the negative input terminal is positively biased via a divider network comprised of resistors 170 and 172; while the positive input terminal is biased to the average amplitude of the IF signal via a low pass, RC filter comprised of resistor 174 and capacitor 176. In this configuration, the output of operational amplifier 164 may be driven into saturation or clipped by relatively small levels of noise entrained in the IF signal applied thereto. Further, by allowing the positive input terminal to ride the average amplitude of the IF signal, the gross extremes in signal strength resulting from transmission distances ranging from a few tens of meters to several hundreds of kilometers, are restricted to a much more limited dynamic range at the output of the first amplifier section 156.

The output of the first amplifier section 156 is capacitive coupled via capacitors 178 and 180 through a conventional low pass, T-section filter comprised of chokes 182 and 184, and capacitor 186. In a preferred form, the components of the intermediate filter section 158 are selected to eliminate any harmonics introduced into the IF signal passing therethrough as a result of the clipping action of the first amplifier section 156.

The second amplifier section 160 includes another high-gain operation amplifier 188 having the input terminal thereof connected to receive the filtered IF signal provided by the intermediate filter section 158. In a manner similar to that in the first amplifier section 156, the negative input terminal of the operation amplifier 188 is positively biased via a divider network comprised of resistors 190 and 192, while the positive input terminal thereof is biased to the average amplitude of the filtered IF signal via a low pass, RC filter comprised of resistor 194 and capacitor 196. The output of the operational amplifier 188, which is biased relative to ground via resistor 198, is capacitive coupled via a capacitor 200 for injection into a choke 202 comprising the output filter section 162. In operation, the operation amplifier 188 will compensate for the power loss associated with passage of the IF signal through the intermediate filter section 158, and will further amplify the IF signal to the point of clipping on the level of the signal and any remaining noise. The IF signal issuing from the second amplifier section 160 will be further filtered in the output filter section 162 to eliminate undesired high frequencies before injection into the correlator 76 via the signal path 90.

Integrated circuit ECL comparators suitable for use as the high-gain operational amplifiers 164 and 188 are manufactured by Advanced Micro Devices of Sunnyvale, California, as Model No. AM685HL. All of the remaining components shown in FIG. 4 are of conventional, well-known construction.

Description of the Detector 78

With reference to FIG. 5, the detector 78 of the shore-based transceiver 12b is comprised primarily of an envelope detector 204, a threshold detector 206, and an AGC circuit 208. Except where noted, the detector 78 of the mobile transceiver 12a is constructed and operates the same as the detector 78 of the shore-based transceiver 12b. As appropriate, references will be made to the various timing diagrams shown in FIG. 6 which illustrates typical wave forms at selected locations within the detector 78 during operation thereof.

The correlation signal issuing from the correlator 76 via the signal path 92 is coupled via capacitor 210 to the base of a gain control transistor 212. A fixed biasing voltage is applied to the base of the transistor 212 via a resistor 214, while a variable biasing voltage is applied thereto through a biasing resistor 216 by a voltage follower 218 forming a portion of the AGC circuit 208. The gain control transistor 212 will invert and amplify the correlation signal applied thereto for application to the envelope detector 204 via a coupling capacitor 220 at a gain proportional to the sum of the biasing voltages. A filtered pull-up network comprised of resistor 222, choke 224, and capacitor 226, provides biasing for the collector of the transistor 212.

Figure 6:
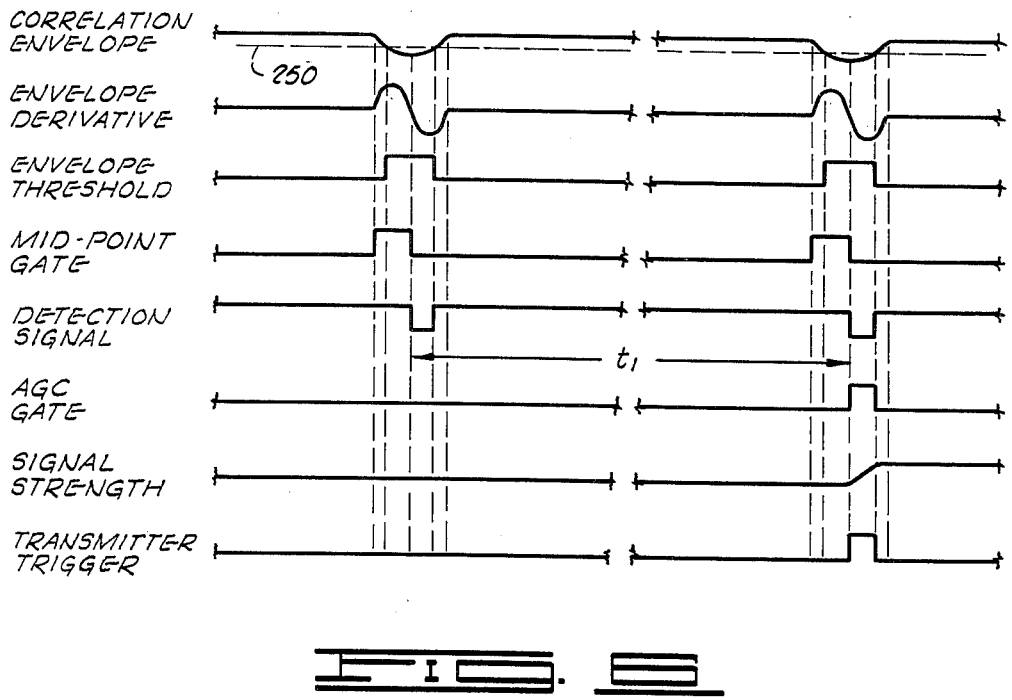
FIG. 6 is a timing diagram illustrating the operation of the detector shown in FIG. 5.

The envelope detector 204 receives the correlation signal applied thereto by the transistor 212 and provides a correlation envelope signal via a signal path 228 the amplitude of which corresponds to the envelope of the received correlation signal (see FIG. 6). Simultaneously, the envelope detector 204 will provide an envelope derivative signal via a signal path 230 the amplitude of which corresponds to the first derivative i.e. the slope, of the correlation envelope (see FIG. 6). In the preferred embodiment, the envelope detector 204 is a video detector manufactured by Motorola Semiconductor Products as Model No. MC1330A1P, and is provided with a frequency compensation network comprised of capacitor 232, resistor 234, and variable choke 236 to optimize the frequency response thereof.

The correlation envelope signal on the signal path 228 is coupled via a capacitor 238 for injection into the positive terminal of a first comparator 240 of the threshold detector 206. The negative input terminal of the comparator 240 is positively biased via a resistor 242, and is capacitively coupled to the positive input terminal thereof via a capacitor 244 and to the system ground via a capacitor 246. A baising voltage provided via a potentiometer 248 determines the detection threshold of the comparator 240. By way of example, for a detection threshold such as that generally indicated at 250 in FIG. 6, the comparator 240 will provide an envelope threshold signal in the high state via a signal path 252 whenever the amplitude of the correlation envelope signal is less than the detection threshold; otherwise, the envelope threshold signal will be in the low state.

The envelope derivative signal, which is biased via a pull-up resistor 254, is coupled via capacitor 256 to the negative input terminal of a second comparator 258 of the threshold detector 206. Both the negative and positive input terminals of the comparator 258 are positively biased via respective resistors 260 and 262, while the positive input terminal is capacitively coupled to the negative input terminal via a capacitor 264 and to the system ground via a capacitor 266. As can be seen in FIG. 6, the comparator 258 will provide a mid-point gate signal in the high state via a signal path 268 when the envelope derivative signal applied thereto is greater than zero; otherwise, the mid-point gate signal is in the low state.

The envelope threshold signal provided by the comparator 240 is connected to a non-inverting input terminal of a two-input NAND gate 270 via the signal path 252, while the mid-point gate signal provided by the comparator 258 is applied to an inverting terminal of the NAND gate 270 via the signal path 268. As shown in FIG. 6, the NAND gate 270 will provide the detection signal in the low state via the signal path 28 in response to simultaneously receiving the envelope threshold signal in the high state and the mid-point gate signal in the low state; otherwise the detection signal will be in the high state.

In the AGC circuit 208, the strength or amplitude of the correlation envelope signal is sampled via a potentiometer 272 and coupled through a capacitor 274 to an amplifier 276 comprised of transistor 278, resistors 280, 282, 284 and 286, and capacitor 288. The output of the amplifier 276 is gated through a transistor 290 in response to an AGC gate signal provided by a timer 292 via a signal path 294 the predetermined time period ($t_1$) after the timer 292 receives the detection signal in the low state from the NAND gate 270 via the signal path 28. The gated signal strength is further amplified by an amplifier 296 comprised of transistor 298 and biasing resistor 300 for temporary storage in an RC averaging network 302 comprised of a signal strength storage capacitor 304 in parallel with a discharge resistor 306. If the component values of the resistor 306 and the capacitor 304 are selected to provide a relatively long time constant relative to the rate of sampling of the correlation envelope, the voltage stored in the capacitor 304 will be a fair approximation of the average amplitude or signal strength of the various pulses comprising the correlation envelope signal. This average signal strength is then buffered via the voltage follower 218 for injection into the AGC gain control transistor 212 via the resistor 216.

In the shore-based transceiver 12b, the control circuit 14a may include an AND gate 308 having the detection signal connected to an inverting input terminal thereof via the signal path 28 and the AGC signal connected to a noninverting input terminal thereof via the signal path 294, as shown in phantom in FIG. 5. In a preferred form, the timer 292 of each of the shore-based transceivers 12b is constructed to provide the AGC gate signal in the high state a unique predetermined time period ($t_1$) after receiving the detection signal in the low state. Therefore, assuming that the mobile transceiver 12a has transmitted two of the phase-modulated request signals spaced the predetermined time period ($t_1$) apart in response to appropriate actuation via the control circuit 14, the threshold detector 206 in a particular one of the shore-based transceivers 12b will provide the detection signal in the low state via the signal path 28 at substantially the same time as the associated timer 292 provides the AGC gate signal in the high state via the signal path 294. In response thereto, the associated AND gate 308 will provide an output signal in the high state for application to the respective modulator 30 via the signal path 18 as the transmitter trigger signal. In this manner, the mobile transceiver 12a may induce a response from each of the shore-based transceivers 12b via the unique pulse-position code assigned thereto.

In the mobile transceiver 12a, the AGC gate signal applied to the transistor 290 via the signal path 294 is provided by the control circuit 14 a predetermined time period after the transmitter trigger signals are applied to the modulator 30. In a preferred form, the control circuit 14 of the mobile transceiver 12a includes a variable timer, in combination with appropriate manual and/or automatic timer adjustment circuits, to predict the precise time at which a phase-modulated response signal should be received from the addressed shore-based transceiver 12b in response to the immediately preceding pair of phase-modulated request signals. Preferably the variable timer will provide the AGC gate signal at substantially the peak of the correlation envelope signal resulting from the received phase-modulated response signal. Since, as a general rule, the rate at which each shore-based transceiver 12b is addressed is relatively high, any error in predicting the precise peak of the correlation envelope signal due to intervening movement of the mobile transceiver 12a will be minimal, and, in fact, may be easily compensated for using conventional techniques.

Since the mobile transceiver 12a must interact with at least two shore-based transceivers 12b in order to provide useful location information, the detector 78 of the mobile transceiver 12a should include a signal strength storage capacitor 304 for each of the shore-based transceivers 12b, as shown in phantom in FIG. 5. In the preferred form, the signal strength stored for each of the shore-based transceivers 12b may be selectively accessed by applying an appropriate gate signal to a gate transistor 310 is interposed between the respective storage capacitor 304 and the system ground, as shown in phantom in FIG. 5.

In practice, the pulse generation and detection techniques disclosed herein have been employed to facilitate reliable and accurate trans-horizon position determination. In addition, the novel configuration of a limiting amplifier in combination with an AGC circuit as disclosed herein has rendered managable the extreme signal strengths inherent in the operation of a trans-horizon navigation system 20 wherein the one-way transmission distance may range from a few tens of meters to several hundreds of kilometers. However, it must be recognized that various changes may be made in the construction and arrangement of the parts or the elements of the various embodiments as disclosed herein without departing from the spirit and scope of the present invention as defined in the following claims.

What is claimed is:

1. In a trans-horizon navigation system, the improvement comprising:
a first transceiver comprising:

a modulator providing a modulation code comprised of a predetermined sequence of control pulses, each of said control pulses having a predetermined one of mutually exclusive first and second states;

an exciter connected to the modulator, the exciter receiving the modulation code and providing a phase-modulated RF signal having a first phase in response to a received control pulse in the first state and a second phase in response to a received control pulse in the second state;

transmitting means connected to the exciter for receiving the phase-modulated RF signal and for transmitting the received phase-modulated RF signal; and a second transceiver comprising:

receiving means for receiving the transmitted phase-modulated RF signal and for providing the received phase-modulated RF signal;

a receiver oscillator providing an RF signal having a predetermined frequency relative to the frequency of the phase-modulated RF signal;

a mixer connected to the receiving means and to the receiver oscillator, the mixer receiving the received phase-modulated RF signal and the RF signal, and providing an IF signal having a frequency proportional to the difference in frequency between the frequency of the received phase-modulated RF signal and the frequency of the RF signal; and a correlator connected to the mixer and responsive to the predetermined sequence of control pulses comprising the modulation code, the correlator receiving the IF signal, detecting the correlation between the received IF signal and the predetermined sequence of control pulses, and providing a correlation signal proportional to the detected correlation, whereby a correlation signal of significant amplitude is indicative of a received phase-modulated RF signal.

2. The trans-horizon navigation system of claim 1, wherein the exciter is further defined to include:

a transmitter oscillator providing a transmitter carrier signal having a predetermined RF frequency; and a phase modulator connected to the modulator and to the transmitter oscillator, the phase modulator receiving the modulation code and the transmitter carrier signal, providing the received transmitter carrier signal as the phase-modulated RF signal in response to a received control pulse in the first state, and inverting the phase of the received transmitter carrier signal for output as the phase-modulated RF signal in response to a received control pulse in the second state.

3. The trans-horizon navigation system of claim 2, wherein the predetermined RF frequency of the transmitter carrier signal is from about 200 MHz to about 3300 MHz.

4. The trans-horizon navigation system of claim 1, wherein the second transceiver is further defined to include:

a detector connected to the correlator, the detector receiving the correlation signal and providing a detection signal in response to receiving a correlation signal exceeding a predetermined threshold value, the detection signal being indicative of a received phase-modulated RF signal.

5. The trans-horizon navigation system of claim 4, wherein the detector is further defined to include:

an envelope detector connected to the correlator, the envelope detector receiving the correlation signal and providing a correlation envelope signal proportional to the envelope of the received correlation signal; and a threshold detector connected to the envelope detector, the threshold detector receiving the correlation envelope signal and providing the detection signal in response to receiving a correlation envelope signal having an amplitude exceeding a predetermined threshold value.

6. The trans-horizon navigation system of claim 5, wherein the envelope detector is further characterized as providing an envelope derivative signal porportional to the first derivative of the correlation envelope signal; and wherein the threshold detector is further characterized as receiving the envelope derivative signal and as providing the detection signal in response to simultaneously receiving a correlation envelope signal having an amplitude exceeding a predetermined threshold value and an envelope derivative signal having an amplitude indicative of the mid-point of the correlation envelope signal.

7. The trans-horizon envelope system of claim 5, wherein the second transceiver is further defined to include:

a limiting amplifier interposed between the mixer and the correlator, the limiting amplifier receiving the IF signal, amplifing the received IF signal while clipping on the amplitude of the noise entrained therein, and providing the noise limited IF signal for application to the correlator.

8. The trans-horizon navigation system of claim 7, wherein the second transceiver is further defined to include:

an AGC circuit having a gain control portion interposed between the correlator and the envelope detector, and a signal strength sampling portion connected to the envelope detector generally between the envelope detector and the threshold detector, the gain control portion receiving the correlation signal and amplifying the received correlation signal for application to the envelope detector at a gain proportional to an average signal strength signal applied thereto, and the signal strength sampling portion sampling the signal strength of the correlation envelope signal at predetermined points thereon, averaging said signal strength samples over a predetermined time period, and applying the average signal strength signal to the gain control portion thereof.

9. The trans-horizon navigation system of claim 1, wherein the correlator is further characterized as a surface acoustic wave delay line having a predetermined pattern of taps formed on a portion thereof; and wherein the predetermined sequence of control pulses comprising the modulation code is selected to correspond to the pattern of taps on said surface acoustic wave delay line.

10. In a trans-horizon navigation system including a mobile transceiver and at least one shore-based transceiver, the improvement comprising:

a modulator in the mobile transceiver providing a modulation code comprised of a predetermined sequence of control pulses in response to receiving a transmitter trigger signal, each of said control pulses being in a predetermined one of mutually exclusive first and second states;

an exciter in the mobile transceiver, connected to the modulator, the exciter receiving the modulation code and providing a phase-modulated request signal having a first phase in response to a received control pulse in the first state and a second phase in response to a received control pulse in the second state;

transmitting means in the mobile transceiver, connected to the exciter for receiving the phase-modulated request signal and for transmitting the received phase-modulated request signal;

means in the shore-based transceiver for receiving the transmitted phase-modulated request signal and for transmitting a phase modulated response signal a predetermined response time period after receiving the phase-modulated request signal, the phase-modulated response signal having the same phase format as the received phase-modulated request signal;

receiving means in the mobile transceiver for receiving the transmitted phase-modulated response signal and for providing the received phase-modulated response signal;

a receiver oscillator in the mobile transceiver providing an RF signal having a predetermined frequency relative to the frequency of the phase-modulated response signal;

a mixer in the mobile transceiver, connected to the receiving means and to the receiver oscillator, the mixer receiving the received phase-modulated response signal and the RF signal, and providing an IF signal having a frequency proportional to the difference in frequency between the frequency of the received phase-modulated response signal and the frequency of the RF signal;

a correlator in the mobile transceiver, connected to the mixer and responsive to the predetermined sequence of control pulses comprising the modulation code, the correlator receiving the IF signal, detecting the correlation between the received IF signal and the predetermined sequence of control pulses, and providing a correlation signal proportional to the detected correlation;

a detector in the mobile transceiver, connected to the correlator, the detector receiving the correlation signal and providing a detection signal in response to receiving a correlation signal exceeding a predetermined threshold value; and means in the mobile transceiver, connected to the modulator and to the detector, said means generating the transmitter trigger signal, receiving the detection signal, determining the travel time period between the generating of the transmitter trigger signal and the receiving of the detection signal, correcting said travel time period for the predetermined response time period, and providing an output signal proportional to the corrected travel time period, said output signal being proportional to the distance between the mobile transceiver and the shore-based transceiver.

* * * * *